(12) United States Patent
Wu et al.

(10) Patent No.: US 10,418,688 B2
(45) Date of Patent: Sep. 17, 2019

(54) MOBILE TERMINAL

(71) Applicant: GUANGDONG OPPO MOBILE TELECOMMUNICATIONS CORP., LTD., Dongguan (CN)

(72) Inventors: Qing Wu, Dongguan (CN); Yizhou Luo, Dongguan (CN); Liang Gu, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/714,804

(22) Filed: Sep. 25, 2017

(65) Prior Publication Data

US 2018/0191058 A1 Jul. 5, 2018

(30) Foreign Application Priority Data

Dec. 29, 2016 (CN) .......................... 2016 1 1246699
Dec. 29, 2016 (CN) ...................... 2016 2 1476820 U

(51) Int. Cl.
| | |
|---|---|
| *H01Q 1/24* | (2006.01) |
| *H04B 5/00* | (2006.01) |
| *G06Q 20/32* | (2012.01) |
| *H01Q 1/22* | (2006.01) |
| *H01Q 7/00* | (2006.01) |
| *H01Q 13/00* | (2006.01) |

(52) U.S. Cl.
CPC ......... *H01Q 1/243* (2013.01); *G06Q 20/3278* (2013.01); *H01Q 1/2225* (2013.01); *H01Q 7/00* (2013.01); *H04B 5/0031* (2013.01); *H04B 5/0081* (2013.01); *H01Q 13/00* (2013.01)

(58) Field of Classification Search
CPC ...... H01Q 1/243; H01Q 2/243; H01Q 1/2225; H01Q 7/00
See application file for complete search history.

(56) References Cited

U.S. PATENT DOCUMENTS

| | | | |
|---|---|---|---|
| 2009/0197654 A1* | 8/2009 | Teshima | G06K 19/07749 455/575.7 |
| 2012/0062428 A1* | 3/2012 | Imano | H01Q 1/243 343/702 |
| 2013/0017867 A1* | 1/2013 | Lee | H01Q 1/243 455/566 |

(Continued)

FOREIGN PATENT DOCUMENTS

| | | |
|---|---|---|
| CN | 105098323 A | 11/2015 |
| CN | 204947063 U | 1/2016 |

(Continued)

OTHER PUBLICATIONS

PCT/CN2017/101913 English translation of International Search Report and Written Opinion dated Nov. 30, 2017, 12 pages.

(Continued)

*Primary Examiner* — Dieu Hien T Duong
(74) *Attorney, Agent, or Firm* — Lathrop Gage LLP

(57) ABSTRACT

A terminal includes: a metal housing; a frame surrounds the metal housing; and a metal antenna radiator arranged between the metal housing and the frame, surrounding the metal housing, and having a first end coupled with a feed source through a matching circuit and a second end grounded.

14 Claims, 2 Drawing Sheets

(56) References Cited

U.S. PATENT DOCUMENTS

| | | |
|---|---|---|
| 2013/0075477 A1* | 3/2013 | Finn ................ G06K 19/07794 |
| | | 235/492 |
| 2015/0097735 A1 | 4/2015 | Kim et al. |
| 2015/0255864 A1* | 9/2015 | Zhang .................... H01Q 7/00 |
| | | 343/855 |
| 2016/0072302 A1 | 3/2016 | Von Novak, III et al. |
| 2016/0072303 A1 | 3/2016 | Jeong |
| 2016/0072337 A1 | 3/2016 | Chang et al. |
| 2017/0142241 A1* | 5/2017 | Kim ..................... H04M 1/026 |
| 2018/0173401 A1* | 6/2018 | Kim ..................... H04M 1/725 |

FOREIGN PATENT DOCUMENTS

| | | |
|---|---|---|
| CN | 106101312 A | 11/2016 |
| CN | 106684529 A | 5/2017 |
| CN | 206432380 U | 8/2017 |

OTHER PUBLICATIONS

European Patent Application No. 17192940.9 extended Search and Opinion dated Apr. 26, 2018, 8 pages.

European Patent Application No. 17192940.9 Office Action dated Sep. 14, 2018, 6 pages.

Chinese Patent Application No. CN201611246699.5 Office Action dated Jun. 19, 2019, 5 pages.

Chinese Patent Application No. CN201611246699.5 English translation of Office Action dated Jun. 19, 2019, 5 pages.

\* cited by examiner

MOBILE TERMINAL

CROSS-REFERENCE TO RELATED APPLICATIONS

This application claims priority to and benefits of Chinese Patent Application No. 201611246699.5, filed with State Intellectual Property Office on Dec. 29, 2016, and Chinese Patent Application No. 201621476820.9, filed with State Intellectual Property Office on Dec. 29, 2016, the entire content of which is incorporated herein by reference.

FIELD

The present disclosure relates to a technical field of communication electronics equipment, and particularly, to a mobile terminal.

BACKGROUND

Near field communication (NFC) technology gets more and more attention in the field of mobile payment due to its security performance. In the related art, a terminal generally multiplexes a ferrite and a flexible printed circuit (FPC) with a mobile communication antenna to realize an NFC antenna. However, the above method for realizing the NFC antenna is more and more difficult and has a poor effect. In addition, the combination of the ferrite and the FPC to realize the NFC antenna has a requirement on an overall thickness of the terminal, which is not conducive to lightening the terminal.

SUMMARY

According to a first aspect of the present disclosure, a terminal is provided. The terminal includes: a metal housing; a frame surrounding the metal housing; and a metal antenna radiator arranged between the metal housing and the frame, surrounding the metal housing, and having a first end coupled with a feed source through a matching circuit and a second end grounded.

According to a second aspect of the present disclosure, a mobile terminal is provided. The mobile phone includes: a metal housing; a frame, surrounding the metal housing, wherein a slot is defined in the frame and surrounds the metal housing; and a metal antenna radiator, arranged in the slot, wherein the metal antenna radiator has a first end coupled to a feed source and a second end grounded.

According to a third aspect of the present disclosure, another mobile terminal is provided. The mobile phone includes: a metal housing; a frame integrally extending from a periphery of the metal housing; and a metal antenna radiator, arranged in the frame and surrounding the metal housing, wherein the metal antenna radiator has a first end fed to a NFC radio-frequency signal source and a second end grounded.

BRIEF DESCRIPTION OF THE DRAWINGS

These and/or other aspects and advantages of embodiments of the present disclosure will become apparent and more readily appreciated from the following descriptions made with reference to the drawings, in which.

DETAILED DESCRIPTION

Figure 1:
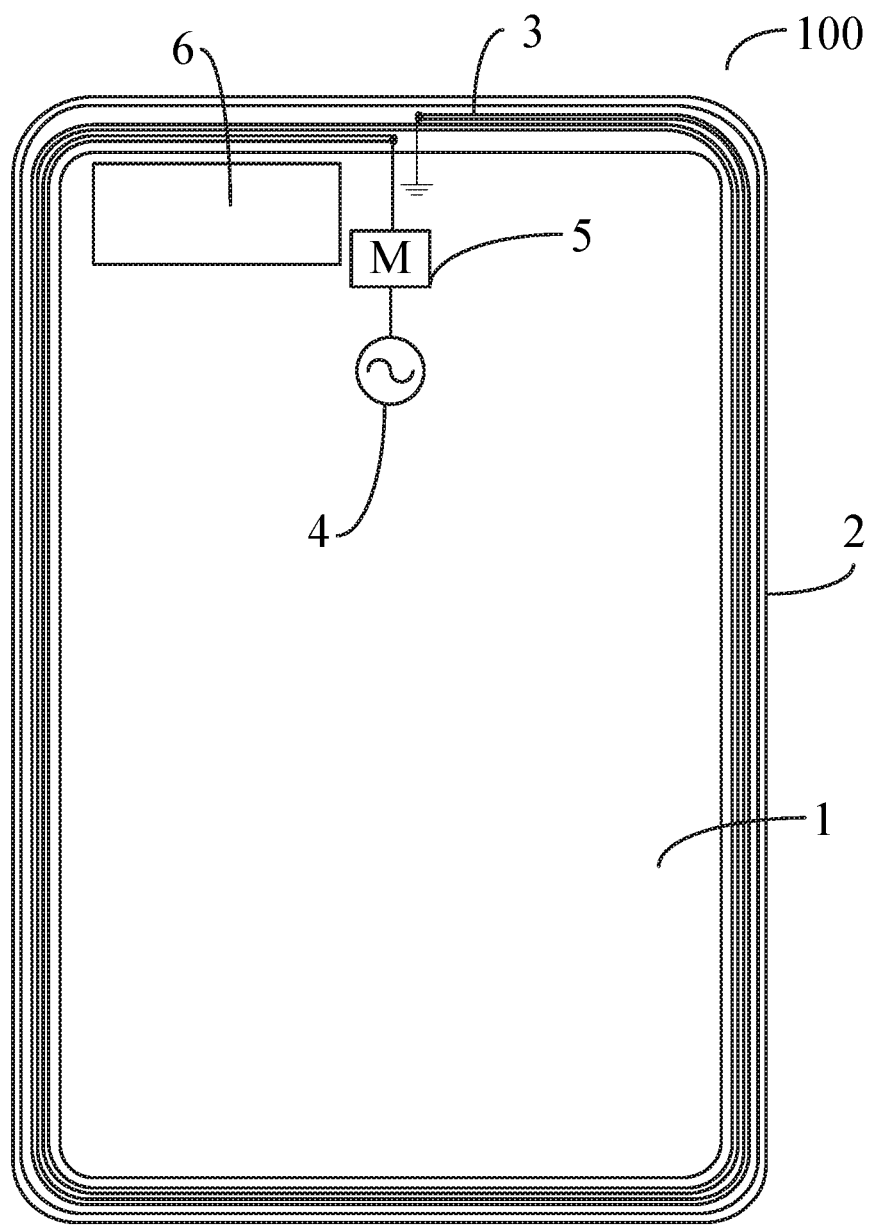
FIG. 1 illustrates a schematic view of a terminal according to an embodiment of the present disclosure.

Embodiments of the present disclosure will be described in detail and examples of the embodiments will be illustrated in the accompanying drawings. The embodiments described herein with reference to the drawings are explanatory, which aim to illustrate the present disclosure, but shall not be construed to limit the present disclosure.

In the description of the present disclosure, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation or the position as described or as illustrated in the drawings under discussion. These relative terms are only used to simplify description of the present disclosure, and do not indicate or imply that the device or element referred to must have a particular orientation, or constructed or operated in a particular orientation. Thus, these terms cannot be constructed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, the term "a plurality of" means two or more than two, unless specified otherwise.

In the description of embodiments of the present disclosure, unless specified or limited otherwise, the terms "mounted," "connected," "coupled" and the like are interpreted broadly, and may be, for example, fixed connections, detachable connections, or integral connections;

may also be mechanical or electrical connections or communicated with each other; may also be direct connections or indirect connections via intervening structures; may also be inner communications or mutual interaction of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

A terminal 100 according to embodiments of the present disclosure will be described with reference to FIGS. 1 to 3. The terminal 100 can be a mobile phone or a tablet panel. In the following description of the present disclosure, a mobile phone is taken as an example of the terminal 100 for illustration.

FIG. 1 illustrates the terminal 100 according to embodiments of the present disclosure, such as the mobile phone. The terminal 100 includes a metal housing 1, a frame 2 and a metal antenna radiator 3.

The frame 2 surrounds the metal housing 1. For example, referring to FIGS. 1 and 2, the metal housing 1 may be a rear cover plate of the mobile phone, while the frame 2 is a side frame of the mobile phone and may be arranged around a periphery of the metal housing 1, in which case the frame 2 has an annular structure.

The frame 2 may be an integrally molded part, and in such a case, the frame 2 is a separate part and is manufactured as a whole to facilitate mass production and processing, thereby improving production efficiency and reducing cost. It should be understood that a specific way of molding the frame 2 is not limited thereto, and for example, the frame 2 may be formed by a plurality of components that are independent from each other.

Optionally, the frame 2 may be a metal part, or a non-metal part. A specific material of the frame 2 may be selected according to practical requirements to satisfy the practical requirements better.

The metal antenna radiator 3 is arranged between the metal housing 1 and the frame 2, and surrounds the metal housing 1. In such a case, the metal antenna radiator 3 is arranged at an outer side of the metal housing 1, to achieve self-integration of the metal housing 1 with no need to redesign the metal housing 1 to realize a near field communication (NFC) antenna. Moreover, since the metal antenna radiator 3 is arranged around the periphery of the metal housing 1, the metal antenna radiator 3 can be remote from a center of the metal housing 1 and adjacent to the frame 2, and an area enclosed by the metal antenna radiator 3 is large, thereby increasing a magnetic flux of the metal antenna radiator 3 remarkably. In addition, since the metal antenna radiator 3 is located between the metal housing 1 and the frame 2, the metal antenna radiator 3 may be hidden in the frame 2, thereby prolonging a service life of the metal antenna radiator 3 and making the appearance of the terminal 100 (like the mobile phone) aesthetic.

An end (e.g. a left end in FIGS. 1 and 2) of the metal antenna radiator 3 is coupled with a feed source through a matching circuit. Optionally, the feed source is an NFC radio-frequency signal source 4, but is not limited thereto. The above end of the metal antenna radiator 3 is fed by means of the feed source such as the NFC radio-frequency signal source 4, and the other end (e.g. a right end in FIGS. 1 and 2) of the metal antenna radiator 3 is grounded.

Optionally, a matching circuit 5 is a capacitor or an inductor, etc. For example, the matching circuit 5 may be a high-quality-factor inductor of hundreds nH (inductance unit, nanohenry) or a capacitor of thousands pF (capacitance capacity unit, picofarad).

For the terminal 100 according to embodiments of the present disclosure, such as the mobile phone, by arranging the metal antenna radiator 3 around the periphery of the metal housing 1, it is advantageous to realize the self-integration of the metal housing 1. Moreover, by realizing the NFC antenna in the above manner, it is possible to reduce the use of a flexible printed circuit (FPC) of the terminal 100 (like the mobile phone), save the cost, and decrease an overall thickness.

In some embodiments of the present disclosure, the number of turns of the metal antenna radiator 3 around the metal housing 1 is denoted as N, in which N satisfies and N may be a positive integer greater than or equal to 1. For example, N is equal to 2, i.e. the metal antenna radiator 3 surrounds the metal housing 1 by two turns, such that a dimension of the terminal 100 (like the mobile phone) can be reduced effectively when the realization of the NFC antenna is ensured.

Optionally, FIG. 1 illustrates that the metal antenna radiator 3 is arranged between the metal housing 1 and the frame 2 and surrounds the metal housing 1 in a direction from an inside to an outside of the metal housing 1 and perpendicular to a thickness direction. The metal antenna radiator 3 may sequentially surround the metal housing 1 along the direction from the inside to the outside of the metal housing 1, such that a plane where the metal antenna radiator 3 is located is parallel to a plane where the metal housing 1 is located. In an embodiment, the metal antenna radiator 3 and the metal housing 1 are located in a common plane. Thus, compared with the realization of the NFC antenna by means of the ferrite and the FPC in the related art, the above method has no requirement for the overall thickness of the terminal 100 (like the mobile phone), and is conductive to making the terminal 100 (like the mobile phone) lightweight and thin. Moreover, the above method may further reduce the use of the FPC of the terminal 100 (like the mobile phone), and save the cost. It should be noted herein that an "inside" direction may be interpreted as a direction towards the center of the metal housing 1, while an "outside" direction may be defined as the opposite direction.

Further, a distance between two adjacent turns of the metal antenna radiator 3 is greater than or equal to 0.1 mm. That is, the two adjacent turns of the metal antenna radiator 3 are spaced apart from each other, and the distance between two adjacent turns of the metal antenna radiator 3 needs to be greater than or equal to 0.1 mm. It could be understood that a specific value of the distance between two adjacent turns of the metal antenna radiator 3 may be adjusted based on actual requirements to meet the actual requirements better. For example, the distance between two adjacent turns of the metal antenna radiator 3 may be set to a small value, such as 0.1 mm, 0.15 mm, 0.2 mm, or the like, so as to reduce a space occupied by the metal antenna radiator 3 in a plane where the terminal 100 (like the mobile phone) is located, and decrease a distance between the frame 2 and the metal housing 1, thereby facilitating miniaturization of the terminal 100 (like the mobile phone).

Figure 2:
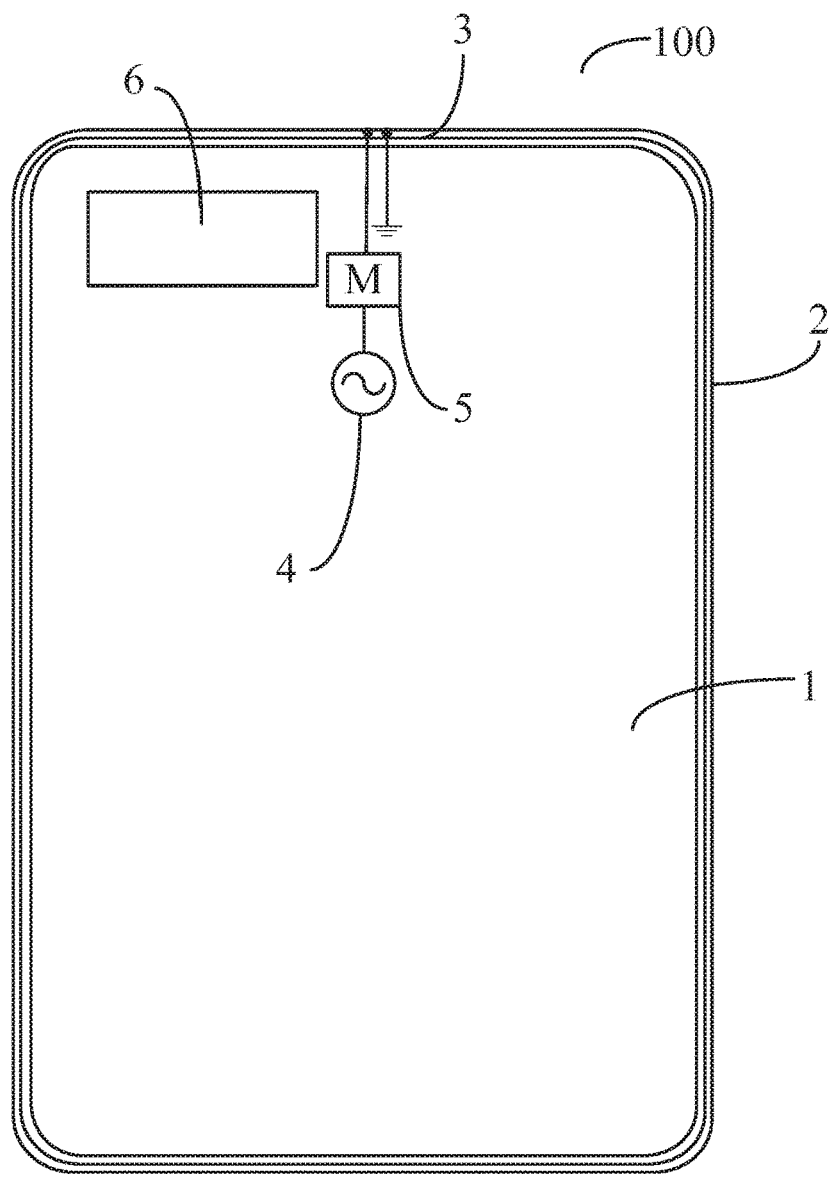
FIG. 2 illustrates a schematic view of a terminal according to another embodiment of the present disclosure.
Figure 3:
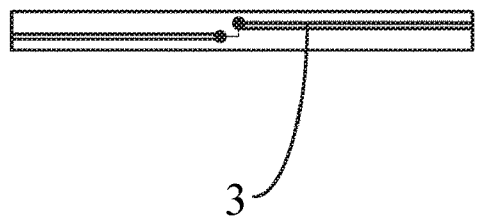
FIG. 3 illustrates a top view of the terminal in FIG. 2.

Optionally, referring to FIG. 2 in combination with FIG. 3, the metal antenna radiator 3 is arranged between the metal housing 1 and the frame 2 along a thickness direction of the metal housing 1. A distance between the metal antenna radiator 3 and a central axis in the thickness direction of the metal housing 1 may be equal anywhere. Therefore, it is possible to reduce the space occupied by the metal antenna radiator 3 in the plane where the terminal 100 (like the mobile phone) is located, and decrease the distance between the frame 2 and the metal housing 1, thereby facilitating the miniaturization of the terminal 100 (like the mobile phone).

Further, a distance between two adjacent turns of the metal antenna radiator 3 is not less than 0.1 mm. In other words, the two adjacent turns of the metal antenna radiator 3 are spaced apart from each other, and the distance between two adjacent turns of the metal antenna radiator 3 needs to be greater than or equal to 0.1 mm. It could be understood that the specific value of the distance between two adjacent turns of the metal antenna radiator 3 may be adjusted based on actual requirements to meet the actual requirements better. For example, the distance between two adjacent turns of the metal antenna radiator 3 may be set to a small value, such as 0.1 mm, 0.15 mm, 0.2 mm, or the like, so as to reduce the space occupied by the metal antenna radiator 3 in the plane where the terminal 100 (like the mobile phone) is located, thereby facilitating the miniaturization of the terminal 100 (like the mobile phone).

In some embodiments of the present disclosure, the terminal 100 (like the mobile phone) may include a camera 6. The camera 6 may be configured as a single front camera, a single rear camera, a dual front camera, or a dual rear camera. It could be understood that a specific type of the camera 6 of the terminal 100 (like the mobile phone) may be determined based on actual requirements to meet the actual requirements better.

For the terminal 100 according to embodiments of the present disclosure, such as the mobile phone, the NFC antenna can be realized by providing the metal antenna radiator 3 in two adjacent turns with a predetermined gap between the two turns on an all-metal battery cover (i.e. the metal housing 1) and an all-metal/non-metal frame 2, and the NFC antenna can be realized in a layout of the all-metal battery cover along with the dual-lens front camera or dual-lens rear camera.

For the terminal 100 according to embodiments of the present disclosure, such as the mobile phone, the realization of the NFC antenna in the layout of the all-metal battery cover can achieve an integration effect of the all-metal battery cover. Moreover, by setting the distance between the two adjacent turns of the metal antenna radiator 3 (e.g. between adjacent two first antenna sub-radiators or adjacent two second antenna sub-radiators) at a small value, the overall thickness and cost of the terminal 100 (like the mobile phone) can be reduced.

Other configurations and operations of the terminal 100 (like the mobile phone) according to embodiments of the present disclosure are well known to those skilled in the art, which will not be elaborated herein.

Reference throughout this specification to "an embodiment," "some embodiments," "an exemplary embodiment," "an example," "a specific example" or "some examples" means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been illustrated and described, it would be appreciated by those skilled in the art that the embodiments are explanatory and cannot be construed to limit the present disclosure, and changes, modifications, alternatives and variations can be made in the embodiments without departing from the scope of the present disclosure. The scope of the present disclosure is defined by the claims and the like.

What is claimed is:

1. A terminal, comprising:
   a metal housing;
   a frame, being a separate part and arranged around a periphery of the metal housing; and
   a metal antenna radiator, arranged between the metal housing and the frame, around the periphery of the metal housing in a direction from an inside to an outside of the metal housing and perpendicular to a thickness direction, having a first end coupled with a feed source through a matching circuit and a second end grounded, and the metal antenna radiator and the metal housing being located in a common plane.

2. The terminal according to claim 1, wherein the number of turns of the metal antenna radiator around the metal housing is denoted as N, and N satisfies N≥1.

3. The terminal according to claim 1, wherein two adjacent turns of the metal antenna radiator are spaced at a distance greater than or equal to 0.1 mm.

4. The terminal according to claim 1, wherein two adjacent turns of the metal antenna radiator are spaced at a distance of 0.15 mm or 0.2 mm.

5. The terminal according to claim 1, wherein the feed source is configured as a near field communication (NFC) radio-frequency signal source.

6. The terminal according to claim 1, wherein the matching circuit is configured as a capacitor or an inductor.

7. The terminal according to claim 1, wherein the frame is configured as a metal part or a non-metal part.

8. The terminal according to claim 1, wherein the terminal is configured as a mobile phone or a tablet computer.

9. The terminal according to claim 8, further comprising a camera, the camera is configured as a single front camera, a single rear camera, a dual front camera or a dual rear camera.

10. The terminal according to claim 9, wherein the metal antenna radiator is arranged in two adjacent turns with a predetermined gap therebetween, and the camera is configured as the dual-lens front camera or dual-lens rear camera.

11. The terminal according to claim 1, wherein the frame is an integrally molded part.

12. The terminal according to claim 1, wherein the metal housing is a rear cover plate of the terminal, the frame is a side frame of the terminal and is arranged around a periphery of the metal housing.

13. A mobile terminal, comprising:
   a metal housing;
   a frame being a separate part and arranged around a periphery of the metal housing, wherein a slot is defined in the frame and surrounds the metal housing; and
   a metal antenna radiator, arranged in the slot, around the periphery of the metal housing in a direction from an inside to an outside of the metal housing and perpendicular to a thickness direction, wherein the metal antenna radiator has a first end coupled to a feed source and a second end grounded, and the metal antenna radiator and the metal housing are located in a common plane.

14. A mobile terminal, comprising:
   a metal housing;
   a frame being a separate part and arranged around a periphery of the metal housing; and
   a metal antenna radiator, arranged in the frame and around the periphery of the metal housing in a direction from an inside to an outside of the metal housing and perpendicular to a thickness direction, wherein the metal antenna radiator has a first end fed to a NFC radio-frequency signal source and a second end grounded, and the metal antenna radiator and the metal housing are located in a common plane.

* * * * *